United States Patent
Etemadi et al.

(10) Patent No.: US 7,317,725 B2
(45) Date of Patent: Jan. 8, 2008

(54) SYSTEM AND METHOD FOR IMPLEMENTING COMBINED PACKETIZED TDM STREAMS AND TDM CROSS CONNECT FUNCTIONS

(75) Inventors: Reza Etemadi, Ottawa (CA); Mark Feeley, Kanata (CA); Michael Gazier, Nepean (CA); Mike Magnusson, Stittsville (CA); Ken Neudorf, Stittsville (CA)

(73) Assignee: Ciena Corporation, Linthicum, MD (US)

( * ) Notice: Subject to any disclaimer, the term of this patent is extended or adjusted under 35 U.S.C. 154(b) by 1114 days.

(21) Appl. No.: 10/453,878

(22) Filed: Jun. 2, 2003

(65) Prior Publication Data

US 2004/0028051 A1 Feb. 12, 2004

(30) Foreign Application Priority Data

May 31, 2002 (CA) .................................. 2388792

(51) Int. Cl.
*H04Q 11/00* (2006.01)
(52) U.S. Cl. .................. 370/395.1; 370/474; 370/375; 370/372
(58) Field of Classification Search .............. 370/395.1
See application file for complete search history.

(56) References Cited

U.S. PATENT DOCUMENTS

| | | | |
|---|---|---|---|
| 6,075,784 A | 6/2000 | Frankel et al. | |
| 6,097,721 A | 8/2000 | Goody | |
| 6,529,510 B1 | 3/2003 | Lee | |
| 6,724,780 B1 * | 4/2004 | Bhuyan et al. | 370/523 |
| 6,801,614 B1 * | 10/2004 | Koda | 379/221.01 |
| 6,959,008 B2 * | 10/2005 | McClary et al. | 370/474 |
| 2002/0097743 A1 * | 7/2002 | Baydar et al. | 370/463 |
| 2002/0105950 A1 * | 8/2002 | Dapper et al. | 370/386 |
| 2003/0043842 A1 * | 3/2003 | Tran | 370/458 |
| 2003/0048777 A1 * | 3/2003 | Ryan et al. | 370/369 |
| 2003/0048781 A1 * | 3/2003 | Pierson | 370/389 |
| 2003/0103508 A1 * | 6/2003 | Landaveri et al. | 370/395.1 |

OTHER PUBLICATIONS

"Circuit Emulation Service Interoperability Specifications Version 2.0," The ATM Forum Technical Committee, document af-vtoa-0078.00, pp. 1-56 (1997).

* cited by examiner

*Primary Examiner*—Creighton Smith
(74) *Attorney, Agent, or Firm*—Merek, Blackmon & Voorhees, LLC (57) ABSTRACT

Apparatus implements combined packetized time-division multiplexed (TDM) streams and TDM cross connect functions. The apparatus includes an input buffer, a reassembly state machine, a frame buffer, and a segmentation state machine. The frame buffer includes multiple bins for storing cell data. The segmentation state machine retrieves information from the bins as associated with each DS0 and assembles output cells for transmitting output DS0s. The cells may be in asynchronous transfer mode (ATM) format, allowing a single ATM backplane to be used for voice signals, data signals, and combined voice/data signals. Various types of ATM cell formats are supported.

34 Claims, 6 Drawing Sheets

| VCa | 5 BYTE ATM HEADER | 24 BYTES CONTAINING ONE FRAME OF 24 DS0s | 24 NIBBLES CONTAINING SIGNALLING FOR 24 DS0s |

*FIG. 6A*

| VCa | 5 BYTE ATM HEADER | 24 BYTES CONTAINING ONE FRAME OF 24 DS0s | 24 BYTES CONTAINING 2ND FRAME OF 24 DS0s |

↕ SAME VC WITH DIFFERENTATION BY BIT IN THE ATM HEADER (FOR EXAMPLE, THE AUU BIT)

| VCa | 5 BYTE ATM HEADER | 24 NIBBLES CONTAINING SIGNALLING FOR 24 DS0s | UNUSED |

*FIG. 6B*

| VCa | 5 BYTE ATM HEADER | 24 BYTES CONTAINING ONE FRAME OF 24 DS0s | 24 BYTES CONTAINING 2ND FRAME OF 24 DS0s |

↕ DIFFERENTATION BY VC

| VCb | 5 BYTE ATM HEADER | 24 NIBBLES CONTAINING SIGNALLING FOR 24 DS0s | UNUSED |

*FIG. 6C*

| 5 BYTE ATM HEADER | 48 BYTES CONTAINING ONE FRAME OF 48 DS0s |

DIFFERENTIATION BY BIT IN ATM HEADER

| 5 BYTE ATM HEADER | 48 NIBBLES CONTAINING SIGNALLING FOR 48 DS0s |

SYSTEM AND METHOD FOR IMPLEMENTING COMBINED PACKETIZED TDM STREAMS AND TDM CROSS CONNECT FUNCTIONS

The present invention relates generally to a telecommunication network and specifically to a system for transmitting a time-division multiplexed (TDM) stream over a packet-based backbone.

BACKGROUND OF THE INVENTION

In telecommunications networks, the vehicle that is used for offering a wide range of different services, such as data, voice and video services, is often based on Asynchronous Transfer Mode (ATM) protocols. These protocols define a particular data structure referred to as a cell, which is a data packet of a fixed size. A cell typically comprises 53 octets, each octet comprising eight bits, and is formed by a five-octet header for transporting routing and user information and a 48-octet payload.

Figure 1:
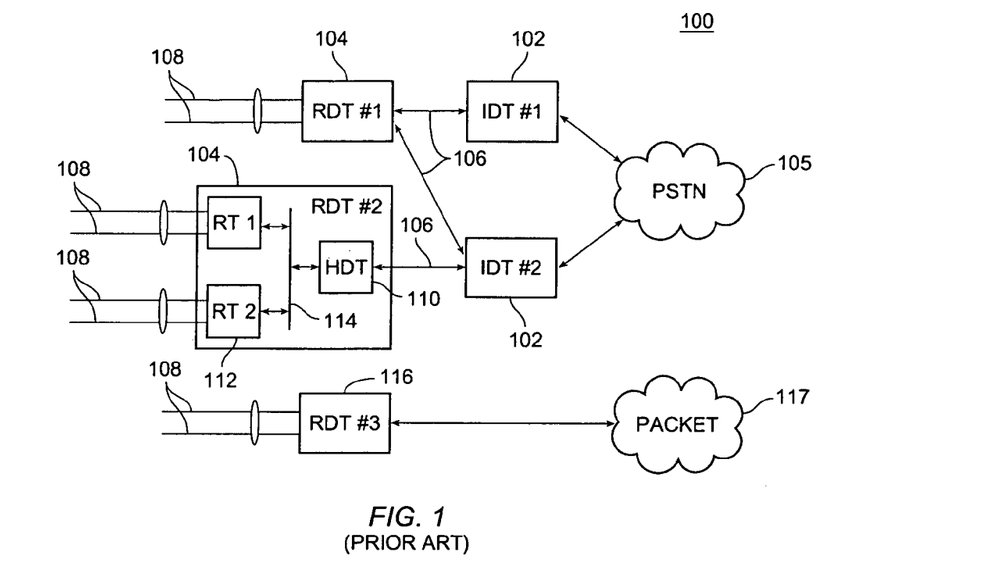
FIG. 1 is a block diagram representing an IDLC (prior art)

Referring to FIG. 1 an industry standard configuration of an Integrated Digital Loop Carrier (IDLC) is illustrated generally by numeral 100. The IDLC comprises an Integrated Digital Terminal (IDT) 102 located at or near a central office (CO) and a Remote Digital Terminal (RDT) 104 located at or near a customer neighbourhood. The IDT 102 is coupled to a Public Switched Telephone Network (PSTN) 105. The IDT 102 is further coupled to the RDT 104 via a high-speed digital circuit 106 such as a T1 or E1, or even higher speed interfaces such as on Synchronous Optical Network (SONET) or Synchronous Digital Hierarchy (SDH). The RDT 104 is further coupled to a plurality of customer loops 108.

Media traffic between the customer loops 108 and the PSTN network 105 is collated by the RDT 104 and multiplexed over the high-speed circuit 106 to the IDT 102. In some configurations, the RDT 104 supports several high-speed circuits 106, with each high-speed circuit 106 coupled with a different IDT 102.

The RDT is an intelligent network element that interfaces between customer access lines and Time Division Multiplexing (TDM) facilities. The RDT 104 comprises a Host Digital Terminal (HDT) 110 and a Remote Terminal (RT) 112. The HDT 110 aggregates traffic from one or more RTs, and terminates interfaces to the TDM facilities, which interface to the PSTN. The RT connects to the customer loops and aggregates the analog signals by multiplexing them into a Digital Transport Facility 114, which supports TDM, Asynchronous Transport Mode (ATM), Internet Protocol (IP) bearer path and the like. A Broadband Loop Carrier (BLC) is an evolving access device providing these functions. BLCs plus other access devices, such as Digital Loop Carriers (DLCs), Digital Subscriber Loop Access Multiplexers (DSLAMs), plus other multi-service equipment, have evolved to provide customer line interface equipment that interfaces both TDM traffic and packetized traffic with the customer loops 108. For example, various Digital Subscriber Line (DSL) technologies provide this functionality.

Primarily, telecommunication access devices have been implemented using TDM as the Digital Transport technology of choice. TDM technology divides the available bandwidth into timeslots and assigns a predefined timeslot to each subscriber line. The subscriber line transmits its data to the network during its assigned timeslot. As such, existing access devices normally provide a TDM interface to the network in the form of T1 or T3 carrier links. As the amount of data traffic travelling over public packet networks outgrows voice traffic, new access devices 116 have become available which provide connectivity to next-generation packet networks, thereby enabling call services to be provided over a packet network 117.

To promote high-speed information transmission, the TDM-based access devices and networks which have already been deployed would have to be replaced with, or augmented with ATM-based access devices and ATM networks, which requires an immense expense. Accordingly, it has been suggested that the TDM network and the ATM network have to be utilized side by side. However, this method requires maintenance of two systems, which can lead to an excessive number of interfaces required for new equipment.

One method of reducing the number of system interfaces (physical buses and/or data links) within both the access device and the network is to use only one protocol for data and voice transfer. This requires that all data flows that are not already in the format of a selected protocol must be encapsulated into the format of the selected protocol before transfer over the system interfaces. It also requires that flows must be recovered from the format of the selected protocol before being processed in their native format.

Thus, there is a need for systems that can efficiently transfer and cross-connect TDM voice flows within standalone nodes such as access devices, or distributed systems linking various nodes across a telecommunications network. It is an object of the present invention to obviate or mitigate at least some of the above-mentioned disadvantages.

SUMMARY OF THE INVENTION

It is an advantage of the present invention that a single packet-based switching protocol can be used within an access device and throughout a telecommunication network for transporting multiple data formats.

In accordance with an aspect of the present invention there is provided a DS0 time switch for cross connecting predefined input and output DS0 pairs for creating a data path in a communication network. The time switch includes the following components: an input buffer for receiving input cells; a reassembly state machine for retrieving information from the input cells in accordance with cross-connect control requirements; a frame buffer for storing the information retrieved by the reassembly state machine in a bin in accordance with its associated input DS0; and a segmentation state machine for retrieving information from a bin in the frame buffer in accordance with an associated output DS0 and using the retrieved information for assembling an output cell and transmitting the output DS0 via the output cell.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 2:
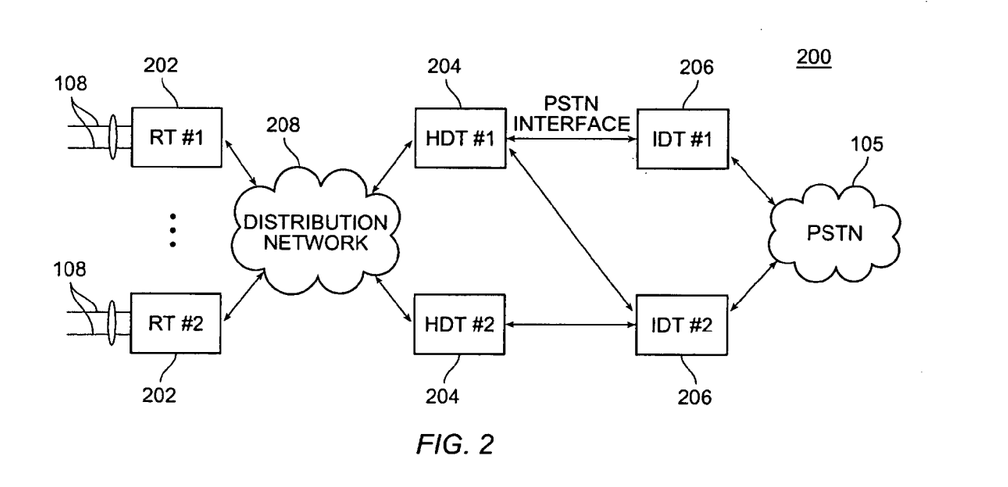
FIG. 2 is a block diagram representing a distributed RDT in accordance with an embodiment of the invention.

For convenience, like numerals in the description refer to like structures in the drawings. Referring to FIG. 2, a distributed RDT network in accordance with an embodiment of the present invention is illustrated generally by numeral 200. The distributed RDT network 200 includes a plurality of remote terminals 202, host digital terminals 204, integrated digital terminals 206, a distribution network 208, and a public switched telephone network (PSTN) 105. Each of the remote terminals 202 can be coupled with a host digital terminal 204 via the distribution network 208. Each of the host digital terminals is coupled with at least one corresponding integrated digital terminal 206. The integrated digital terminals 206 are coupled to the PSTN 105.

Generally, a remote digital terminal is used to provide access between customer loops, which may be either residential or business, and a centralized network of components. In order to provide a greater span of control, the remote terminal 202 is subtended from one or more host digital terminals 204. This is achieved via the distribution network 208. The distribution network 208 represents a general packet network. The packet network may include access to packet networks owned by other service providers, as well as the Internet and PSTN, via trunking gateways, as will be appreciated by a person skilled in the art.

The host digital terminals 204 provide support for high capacity connections, such as T1 circuits for example, to the integrated digital terminals 206. The remote terminals provide support for end-user loops, or subscribers. Thus, the present configuration uncouples the direct relationship between the host digital terminals 204 and the remote terminals 202. As a result, a control mechanism is used to couple the host digital terminals 204 and the remote terminals 202. Such a control mechanism is provided by the distribution network 208. The distribution network 208 is capable of coupling any of the remote terminals with any of the host digital terminals.

The host digital terminal includes support of one or more of integrated network access (INA), TR08, GR303, PRI, E1 Channel Associated Signalling (CAS) and V5 interface groups for communicating with the IDT, plus contains at least one timeslot interchanger (TSI) for DS0 cross connects. The above standards are well known in the art and thus will only be described briefly herein. INA is a method of unbundling DS0s into INA groups as D4 framed DS1s. An INA group typically consists of between 1 and 28 DS1s. INA is protocol supported so that a service provider can unbundle the loops to a channel bank to provide an analog handoff to an alternate service provider if required. TR08 interface is an IDLC configuration that is derived from Lucent Technologies SLC96 DLC products. TR08 mode 1 consists of four DS1s (96 DS0s) that serve up to 96 lines with no concentration. TR08 mode 2 uses two DS1s (48 DS0s) that serve up to 96 lines providing 2:1 concentration. A GR303 interface is an IDLC configuration that is the successor to TR08. GR303 supports between 2 and 28 DS1s, 1 to 2048 lines with up to 9:1 concentration. Two of the T1 links used in an interface group contain a Timeslot Management Channel (TMC) used for call processing and an Embedded Operations Channel (EOC) used for management. Each of these channels occupies a DS0. Primary rate interface (PRI) is an Integrated Services Digital Network (ISDN) level of service typically used for connecting businesses with a central office. E1 CAS is a system in which control signals are transmitted in the same channel as the data and voice signals.

Both the remote terminals and the host digital terminals further include a timeslot interchanger (TSI). The TSI is used for grooming loops together so that they can be unbundled as one digital handoff through the distribution network. Thus, the remote terminal may be partitioned in such a way that each type of customer loop is grouped together. That is, for example, incumbent local exchange carrier (ILEC) customer loops can be grouped together and competitive local exchange carrier (CLEC) customer loops can be grouped together. Furthermore, since there may be more than one CLEC, the customer loops of one CLEC can be grouped separately from other CLECs. The remote terminal is partitioned such that a different host digital terminal can control each partition.

Furthermore, having a TSI at the remote terminal enables loop concentration to be performed at the remote terminal instead of the host digital terminal, where use of distribution network bandwidth is not economical. That is, data from a host digital terminal destined for multiple loops at the same remote terminal can be transmitted to that terminal via one or more paths in the distribution network. Once the data arrives at the remote terminal, the TSI routes the data to corresponding loops. Typically, the number of DS0s, transferred between the remote terminal and the host terminal, in such a case is less than if there was no TSI at the remote terminal and the host digital terminal has to transfer separate DS0s for each loop destination.

Figure 4:
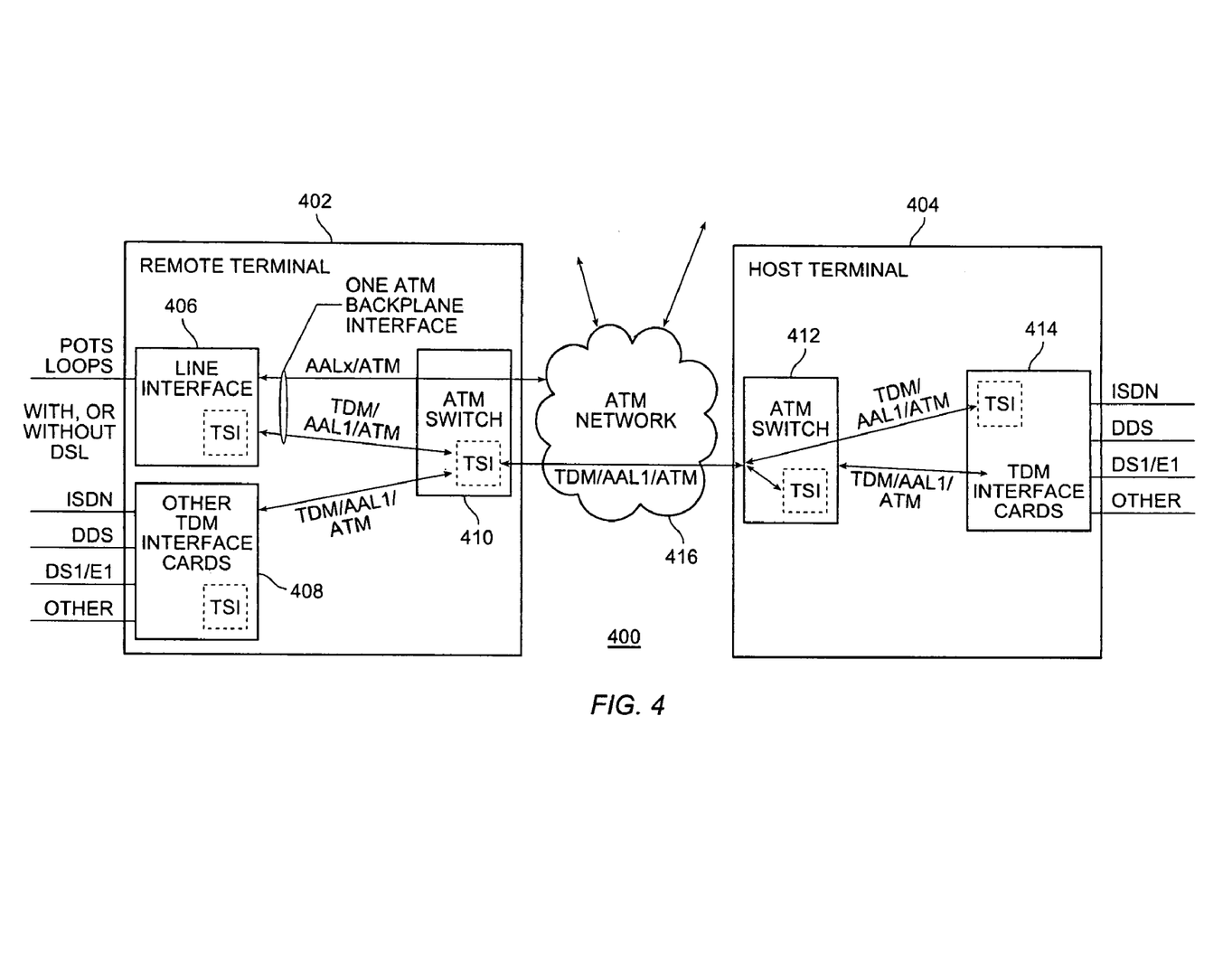
FIG. 4 is a block diagram of a system in accordance with an embodiment of the present invention.

Referring to FIG. 4, a diagram representing a network configuration is illustrated generally by numeral 400. The network 400 includes a remote terminal 402 and a host terminal 404. The remote terminal 402 includes a line interface 406 and an ATM switch 410. The remote terminal 402 may further include a plurality TDM interface cards 408. The host terminal 404 includes an ATM switch 412 and TDM interface cards 414. The remote terminal 402 and the host terminal 404 are coupled by a network 416, which is an ATM network in the present embodiment.

The remote terminal TSI can be incorporated into a common card, such as the ATM switch 410 within the system. As a result, the various interface cards 406 and 408 are connected to the ATM switch 410 via ATM Adaptation Layer 1 (AAL type 1) over an ATM backplane. TSIs can also be incorporated within one or more of the line interface 406, TDM interface cards 408, or other server cards in the remote terminal. The host terminal TSI can be incorporated into either, or all of, the ATM switch 412, the TDM interface cards 414, or in other system server cards.

Figure 3:
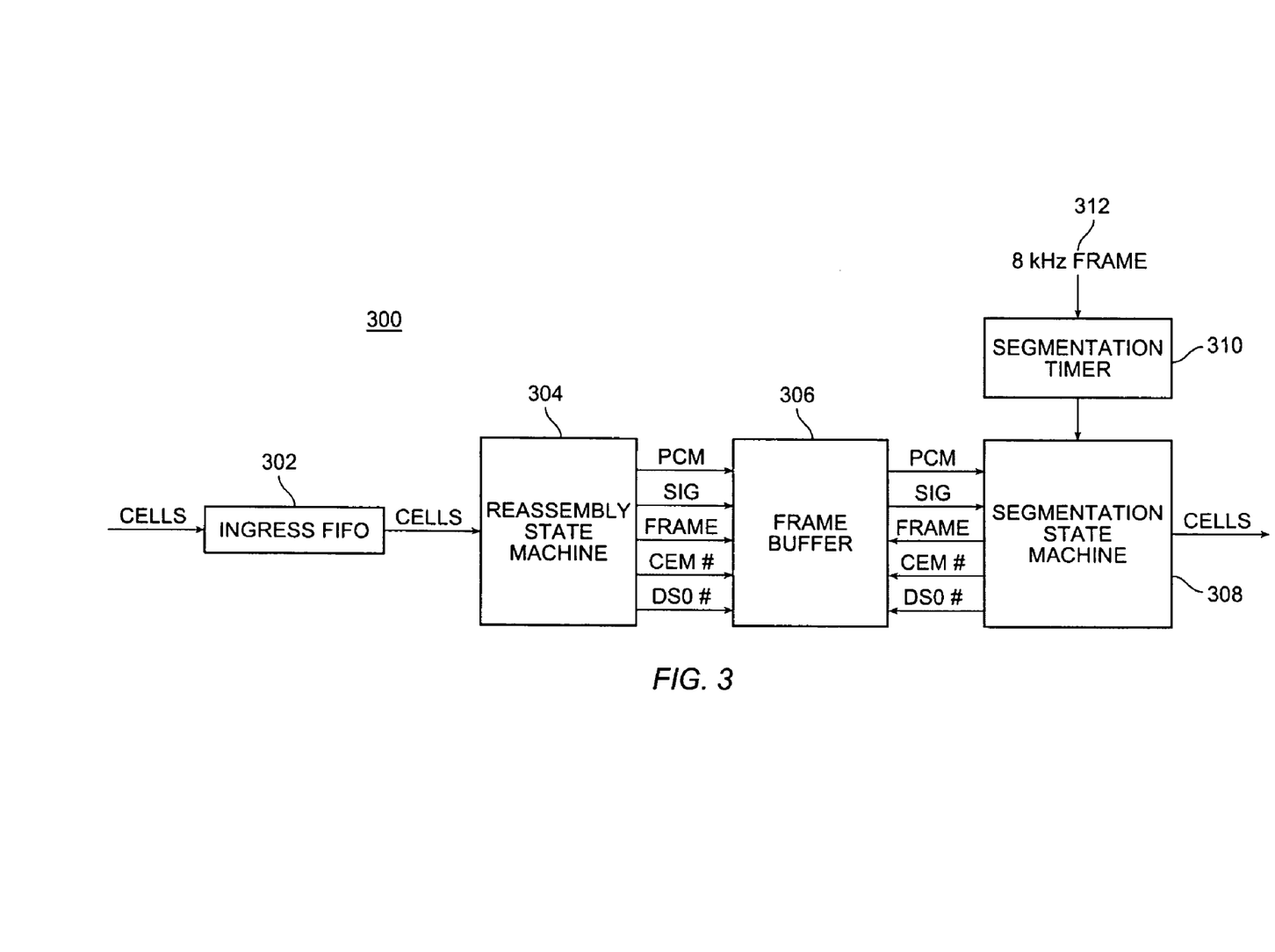
FIG. 3 is a block diagram of a timeslot interchanger in accordance with an embodiment of the invention.

Yet further, in the present embodiment the TSI in the RDT is used for providing a DS0 cross connect for coupling AAL type 1 stream DS0s carrying signals from customer loops to AAL type 1 stream DS0s being transported to the HDT. Referring to FIG. 3, a TSI in accordance with an embodiment of the present invention is illustrated generally by numeral 300. The TSI 300 includes an ingress buffer 302, which is connected to a reassembly state machine 304, which is connected to a DS0 frame buffer 306, which is, in turn, connected to a segmentation state machine 308. The segmentation state machine 308 is further connected to a segmentation timer 310, which is clocked by a frame clock 312.

The reassembly state machine 304 performs AAL type 1 reassembly on incoming AAL type 1 cells received via the ingress buffer 302. That is, each AAL type 1 cell is broken down into its constituent parts. Error conditions, such as lost cells and mis-inserted cells are handled by the AAL type 1 protocol. In the present embodiment, the sequence of the AAL type 1 cells received by the ingress buffer 302 comprises a plurality of per DS0 (or per n×DS0) Pulse Code Modulated (PCM) data and may also contain per DS0 signalling information. The AAL type 1 sequence of cells includes Circuit Emulation Service over ATM (CES) multi-frame structure which allows individual DS0s to be identified and then cross connected. The reassembly state machine breaks down the AAL type 1 cell as is known in the art and in accordance with the International Telecommunication Union ITU-T I.363.1 standard.

In the present embodiment, the reassembly state machine 304 operates at 50 MHz so that it is capable of processing a total of 100 CESs having 32 DS0s per CES. Thus, a total of 3200 possible cross connect paths are available. After the reassembly state machine 304 has disassembled the AAL type 1 cell, the constituent parts are forwarded to the frame buffer 306. Specifically, these parts include data (either four bits of signalling or eight bits of PCM), a PCM/Signalling indicator, a frame number, a CES number (from 0-149), and a DS0 number (from 0-31).

The frame buffer 306 comprises a plurality of individual bidirectional DS0 bins. In the present embodiment, 2048 bins are used. Each bin includes two PCM first-in, first-out (FIFO) buffers A and B, one for each direction of communication. Each of the PCM buffers is capable of storing enough PCM samples to accommodate the amount of jitter in the packet network. For example, a 32-byte PCM buffer allows 32 frames to be accommodated. At 125 usec per byte, the buffer allows for approximately 4 msec of jitter. Further, two signalling FIFO buffers C and D are provided, one for each direction of communication. In this embodiment, each of the signalling buffers is capable of storing at least 2 signalling nibbles each.

Each of the DS0 bins has two endpoints, referred to as endpoint 0 and endpoint 1. When endpoint 0 performs a read operation, it reads from FIFO A. When endpoint 0 performs a write operation, it writes to FIFO B. When endpoint 1 performs a read operation, it reads from FIFO B. When endpoint 1 performs a write operation, it writes to FIFO A. Thus, to establish a connection between DS0 α of CES Ψ and DS0 β of CES Φ, using bin Λ, DS0 α of CES Ψ must be associated with endpoint 0 of bin Λ, and DS0 β of CES Φ must be associated with endpoint 1 of bin Λ.

There are 2048 sets of pointers associated with the DS0 bins, including a pointer for each direction of the bin. The same set of pointers is assigned to all DS0 bins sharing the same ingress and egress CES address. That is, multiple DS0 bins may be assigned to each group of pointers. This allows DS0 alignment to be maintained in the event of buffer overflow and underflow. DS0 alignment means that samples which are received in the same frame of the same CES on ingress are transmitted on the same frame of the same CES on egress. Bins sharing the same pointers constitute a pointer group. Note also that the endpoint assignments within a pointer group must agree. That is, all the bins in a group must have the same CES as endpoint 0, and the same CES as endpoint 1.

The segmentation state machine 308, segmentation timer 310, and frame clock 312 work in concert to encapsulate AAL type 1 cells from the frame buffer. In general, the segmentation state machine 308 encapsulates data from the frame buffer in accordance with the ITU-T I.363.1 standard, as is known in the art. The segmentation timer instructs the segmentation state machine for which CES to generate an AAL type 1 cell and when to generate the cell.

The segmentation timer 310 works on the following principle. All 100 CESs have a register within the segmentation timer, which sets up AAL type 1 ATM cell fill size, number of DS0's per CES, the number of frames in each Extended Super Frame, and CAS enable. For every period of time determined by the frame clock, the segmentation timer updates a counter for each of the 100 CESs. In the present embodiment, the frame clock is an 8 kHz clock and thus the period of the clock is 125 µs. When the counter reaches the ATM cell fill size for a particular CES, a signal is sent to the segmentation state machine to generate a new cell for that CES. After the cell is generated, the counter is decremented by the number of bytes transmitted by the segmentation state machine.

The segmentation state machine runs at a 50 MHz clock, thus it is capable of generating a total of 100 CESs with 32 DS0s per CES. The AAL type 1 cell formats supported are, any combination of structured CAS, non-CAS, full fill and partial fill. Frame sizes of 1 to 32 DS0's are also supported.

Optionally, a co-processor can be added to the TSI to allow interoperability between GR303, TR08, INA, or other interfaces. The co-processor is responsible for providing appropriate signalling bit conversions, plus any data default value changes as will become appreciated by a person skilled in the art.

The operation of the system detailed above is described as follows. In order to establish a connection between a first DS0 on a first CES and a second DS0 on a second CES, or the same CES, the following procedure is performed. Typically, the connection is established by call control signals before the communication signals are transmitted from the customer loops. First, an available bin is identified for making the connection. In the present embodiment, there are a possible 3200 connections, but only 2048 bins. Thus, there are not enough bins to establish a one to one relationship. As a result, the bins are assigned dynamically as they are needed. The number of bins selected for the present embodiment is deemed to be sufficient as it is assumed that a maximum of approximately 65 percent of the lines are going to be in use at any given point in time. Those skilled in the art will appreciate that a larger, or smaller, number of bins may be used.

If a pointer group exists between the first and second CESs, the existing pointer group is utilized. Otherwise an available pointer group is retrieved and reinitialized. A DS0 Pointer Assignment Lookup Table is setup to associate the assigned bin with the pointer group used. Further, entries in a DS0 Bin Assignment Lookup Table are setup to associate one DS0 to endpoint 0 of the bin, and one DS0 to endpoint 1 of the bin. If there are other bins in this pointer group, the endpoints of the new bin should match the endpoints of the other bins (that is, 0 with 0, 1 with 1). Once the connection has been established, the cells can be routed properly.

Incoming signals from the customer loops are received at the remote terminal, converted to TDM (if not already in TDM format), and encapsulated as AAL type 1 cells. This provides the advantage that only one backplane, an ATM backplane, can be implemented by the system. This reduces both the cost and complexity of the system.

The information encapsulated in the AAL type 1 CES stream includes the signal received on the loops and associated signalling. The CES multi-frame structure allows individual DS0s to be identified. It is likely that information from a plurality of customer loops will be encapsulated in each AAL type 1 cell. The information is retrieved from the plurality of customer loops and inserted into an AAL type 1 stream. The AAL type 1 cells are switched and/or routed within the remote terminal to the TSI. After cross connect within the TSI, the new AAL type 1 CES streams are transported through the distribution network to a destination HDT, in accordance with their routing information.

The reassembly state machine receives the AAL type 1 cells, retrieves the signal and uses switching and/or routing information to transmit the information to the frame buffer. The frame buffer works as follows. When a byte is received by the frame buffer, the CES of the received cell and the DS0 number of the received byte are used as a pointer to select the destination bin. The destination bin address is then used to look up the pointer group, and therefore the pointers, associated with the bin. The pointers are then read, updated, the DS0 byte is written into the DS0 bin, and the pointers are then written back into a pointer random access memory (RAM). In the present embodiment, this all occurs in one clock cycle. Both the segmentation and reassembly state machines communicate the frame number to the DS0 frame buffer. The last frame number received by the frame buffer is stored for each pointer group. When the frame number changes, the pointer is updated.

When reading from the DS0 frame buffer a similar operation is performed. The CES and DS0 requested are used as an address to a DS0 bin in the assignment table. The DS0 number selected is used as a pointer to the appropriate pointer block, the pointers are read, and the DS0 byte is retrieved. The pointers are updated and written back into the associated pointer block. All of this occurs all within one clock cycle. If no valid DS0 data is in the bin, one of a number of alternate patterns can be substituted for the missing data. These alternate patterns are used at various times in order to insert required traffic patterns (such as idle PCM and idle signalling) as determined by the TDM interface requirement specifications.

As previously described, the segmentation timer controls operation of the segmentation state machine. That is, the segmentation timer uses a counter for determining when the segmentation state machine encapsulates the next AAL type 1 cell for each of the 100 CESs. As an example, transport across the distribution network is provided using E1 CES. E1 can carry 32 channels at eight bits per channel. Thus, only 32 bytes is transported per 8 kHz. However, a standard ATM cell is 53 bytes, approximately 48 of which is payload information. Thus, approximately 48 TDM DS0 and/or signalling bytes are transmitted in each AAL type 1 cell. As a result, the counter increments its count once ever 125 usec in accordance with the equation Count=Count+ # of bytes per frame. The number of bytes transmitted per frame include the number of DS0s per frame plus the number of signalling bytes required to be sent in that frame. If the count is greater than the number of bytes per cell, then the segmentation state machine is enabled to generate an AAL type 1 cell, and the count is updated according to the equation Count=Count–# bytes transmitted in that cell.

The 125 usec interval is divided evenly among the 100 CESs in 1.25 usec increments. Thus, each CES transmits at a predetermined instant within the 125 usec interval. This also helps load spreading which can result in better system and network behaviour. Alternately, some CESs may be assigned a higher priority than other CESs and thus would be given access in accordance with its assigned priority. In the extreme, one CES may be given strict priority such that it transmits whenever it has data available to transmit, regardless of the state of the other CESs. Concepts for assigning bandwidth based on priority and the arbiters for implementing them are known in the art and need not be described in detail.

Figure 5:
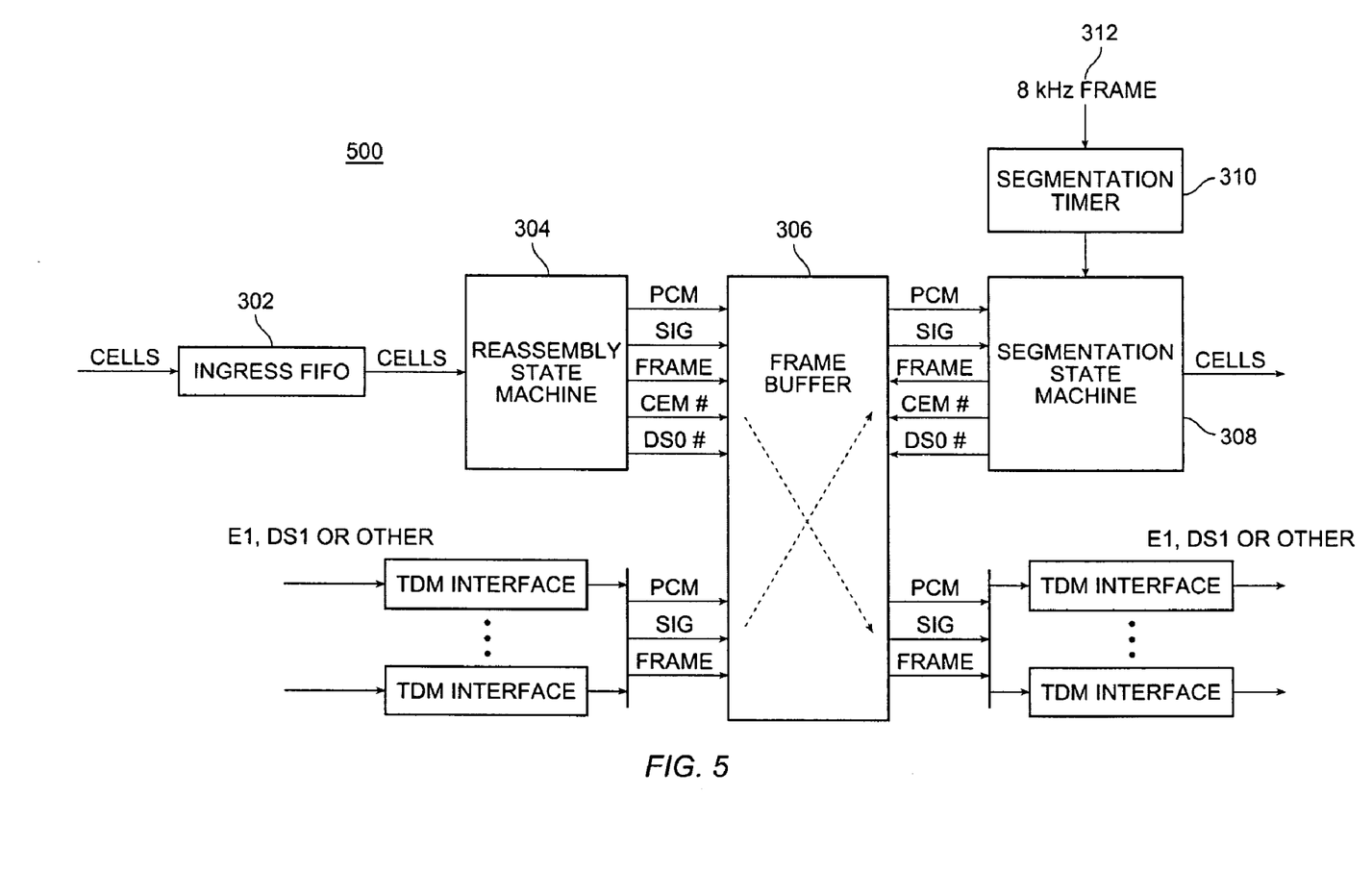
FIG. 5 is a block diagram of a timeslot interchanger in accordance with an alternate embodiment of the invention.

FIG. 3 indicates a TSI that can be applied in applications where there are ATM interfaces on both the transmit and receive sides of the TSI. This is valid for various applications, such as that indicated in FIG. 4 within the ATM switches at both the Remote Terminal and the Host Terminal. Note however that the TSI on the TDM interface card uses a TSI that has an ATM interface for transmission and reception on one side and a TDM interface on the other side. Referring to FIG. 5, an enhanced TSI is illustrated for receiving and transmitting both TDM and ATM data. The TSI is similar to the TSI illustrated in FIG. 3, with the addition of standard TDM interfaces. These interfaces are used to transmit and receive TDM data and signalling to and from the frame buffer on a frame-by-frame basis, in the same manner as previously described for the ATM interfaces. TDM interfaces are known in the art and, thus, need not be described in greater detail.

Thus it can be seen that the invention enables a single backplane system (ATM in this example) to be capable of sending voice, data, or both voice and data signals over a common backplane throughout the system. Further, the system may be a distributed system as illustrated in FIG. 2, or a stand alone system as illustrated in FIG. 1. Note that the CES service can be used for transporting any TDM service such as voice, frame relay or private lines.

The above description was made with reference specifically to AAL type 1 for convenience. Other AALs such as AAL type 0, AAL type 2 and AAL type 5 may also be used. Similarly, reference was made specifically to ATM for convenience. The invention is applicable to other packet-based communication protocols, such as MPLS TDM encapsulation, Ethernet TDM encapsulation, and Internet Protocol (IP) encapsulation, as will be appreciated by a person skilled in the art. Also, a person skilled in the art will appreciate that although segmentation and reassembly typically refers specifically to AAL-based protocols, the terms are used generically herein to refer to methods for disassembling and reassembling packets in accordance with the communication protocol being employed.

The above description also generally describes voice TDM signals being encapsulated into AAL type 1 CES streams. The same approach allows any TDM signals, such as ISDN, Digital Data Service (DDS), and the like, that are carried in TDM n×DS0 format, or p×DS0 format (with, or without associated signalling) to be transported and cross connected in this system and network. Note that n implies consecutive DS0s in a stream, and p implies DS0s in streams that are not necessarily consecutive.

Although the above description refers specifically to a hardware implementation of the invention, a person skilled in the art will appreciate that the invention can be implemented in software using microcode, for example.

However, although the invention as described above is sufficient for many applications, applications that are particularly time sensitive may require further enhancements to the system. For example, in some TDM networks, delay of the signal being transported within the DS0s must be minimized, where every 125 usec frame of delay needs to be saved if possible. Excessive delay can cause problems with perceived voice echo, and with time sensitive protocols that use the DS0 for transport. Standard AAL type 1 CES implementations that may be used in other applications do not necessarily meet this requirement. Thus, the following describes preferred methods of encapsulating TDM DS0 traffic into AAL type 0 ATM cells, and transporting them within a system, while providing a low delay path for the DS0. These formats can be used to transport TDM DS0s between various TDM interfaces, TSIs and other devices in all the same system applications discussed above.

Important implementation factors for a custom AAL type 0 include the following. The need for frames of TDM traffic to wait before being transmitted must be minimized. Further, it is preferable that all ATM cell transfers of TDM traffic, and associated TSI cross connections, occur within less than one TDM frame time (125 usec). The cross-connected DS0 is therefore ready to be transmitted to its next destination during the next frame interval. However, a low delay implementation has been shown to work even for cases where a delay greater than one frame is experienced.

The very lowest delay implementations will allow all ATM cell transfers of TDM traffic and the DS0 cross connect to occur in as small a time as possible, less than one frame time, and allow the cells containing the cross connected DS0s to be transmitted as soon as all data is available. Thus, instead of waiting for a signal from the frame clock, the segmentation state machine transmits a cell as soon as it has received all the necessary data. As a result, systems could be built with only a few microseconds of extra delay, caused by the addition of the DS0 cross-connect function, compared with at least one frame delay, or 125 usec as previously described.

Figure 6A:
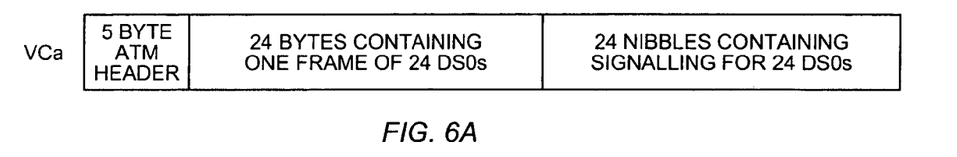
FIGS. 6a-c are block diagrams of a cell structure in accordance with an embodiment of the invention.

In a first embodiment, 24 DS0s are required to be transferred, once per frame, from a TDM interface. As with AAL type 1 CES multi-frame with CAS, signalling must also occasionally be transferred. Since only 24 bytes are used to transfer the 24 DS0s every frame, the associated signalling can most easily be transferred within the remaining 24 payload bytes of each cell. An implementation like this is referred to as partial cell fill. Referring to FIG. 6a, a cell structure for such a cell is illustrated.

When all ATM cell transfers with TDM traffic to be cross connected occur within the desired 125 usec, then the per DS0 receive buffer only needs to be as deep as the number of frames carried in the each cell. Data received from one cell is transmitted before the next cell provides more data. Errors, such as lost cells and mis-inserted cells must be handled. If a cell is lost then a repeat of what was transmitted during the previous frame is transmitted. Normal operation immediately restarts when the next cell arrives. In the case of a mis-inserted cell, the proper data within the buffer may be overwritten. If the valid data has already been received for the next frame interval, then the mis-inserted data will overwrite the valid data and result in a temporary data corruption. If the valid data arrives after the mis-inserted data, and before the next frame interval, then no data corruption occurs. This solution always results in each DS0 being carried with bit count integrity, even under cell loss, or mis-inserted cell conditions.

In cases where cells are not guaranteed to arrive within the 125 usec interval, then the size of the per-DS0 receive buffer may be increased. In this case, one skilled in the art will recognize that extra functionality will need to be implemented in order to ensure that per-DS0 bit count integrity is maintained when errors such as lost cells or mis-inserted cells occur. Note that extended intervals where no cells arrive, either intentionally, or accidentally, result in a loss of datapath being detected and reported to high level control software, which instructs the insertion of a predefined alternate traffic pattern into the transmitted DS0 bytes as previously described.

Figure 6B:
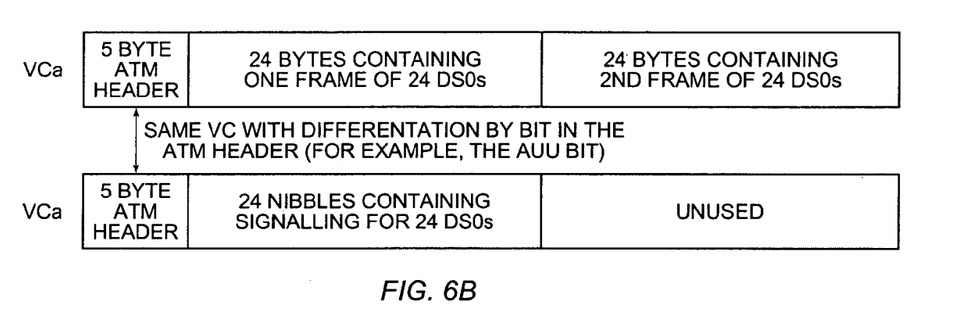

Referring to FIG. 6b, a cell structure for a bandwidth optimized implementation is illustrated. In the present implementation, the number of unused bytes per ATM cell are minimized by placing 2 frames (2 frames×24 DS0s=48 bytes) into an AAL type 0 cell and transmitting the cell as soon as the second frame has arrived. The extra signalling cell is then transmitted at predefined intervals, in the order of milliseconds, depending on the signalling update interval of the superframe being used, such as the DS1 super frame, E1 super frame, or DS1 extended super frame.

Only one virtual circuit (VC) per DS0 may be used for both data plus signalling if the signalling cell is differentiated from a data cell by use of an available bit within the ATM cell header. For example, the ATM-User-to-ATM-User (AUU) indication parameter within the Payload Type Indicator (PTI) field, which is typically used for AAL5 End of Packet indication, can be used since this ATM VC will be configured for non-packet transfer mode.

Figure 6C:
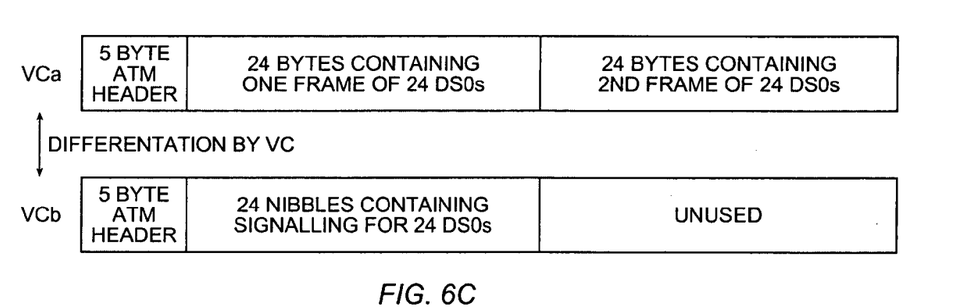

Referring to FIG. 6c, an alternate cell structure is illustrated. Instead of using a bit within the header to identify the signalling cell, a pair of virtual circuits (VCs) is used. One of the VCs is used for TDM payload and the other VC is used for signalling information.

This custom AAL type 0 stream format can be implemented between TDM interface cards and the TSI, resulting in a maximum 2 frame delay before the frame reaches its end point. After cross connecting, the TSI can then transmit a second TDM over ATM stream towards the cross connected TDM interface card. This second stream does not need to be the same format as the one described above flowing into the TSI. This second stream could be standard AAL type 1, or any other format.

At the expense of wasting bandwidth, a frame of delay per direction could be eliminated by transmitting a single ATM cell every frame, the format of which is illustrated in the lower frames of FIGS. 6b-6c.

Figure 7:
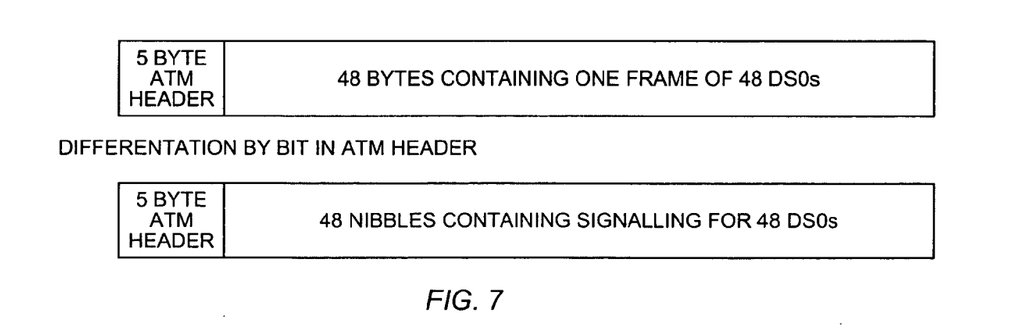
FIGS. 7 is a block diagram of a cell structure in accordance with an alternate embodiment of the invention.

Referring to FIG. 7, a second embodiment of a cell structure is illustrated. In the second embodiment, 48 DS0s are required to be transmitted from a TDM interface, once per frame. This embodiment is similar to the first embodiment, except that a cell is transmitted every frame, instead of every 2 frames. The differentiation between a data cell and a signalling cell can be made either by setting a bit in the header or by using different VCs as described in the previous embodiment. This results in only a one frame delay before the TDM DS0 reaches its endpoint.

Figure 8A:
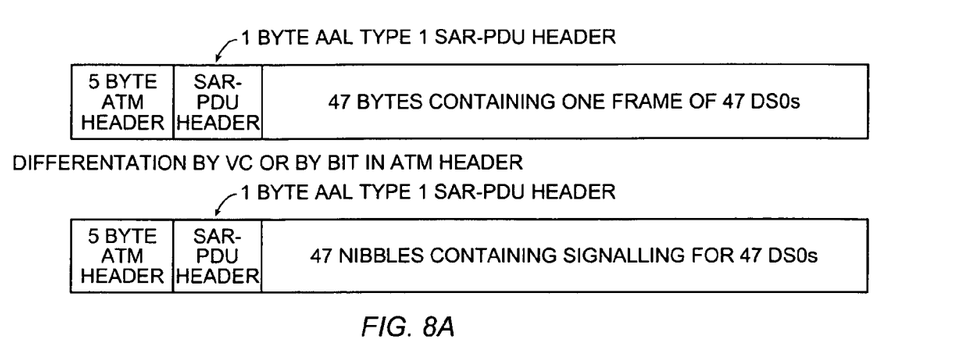
FIGS. 8a-c are block diagrams of a cell structure in accordance with yet an alternate embodiment of the invention.
Figure 8B:
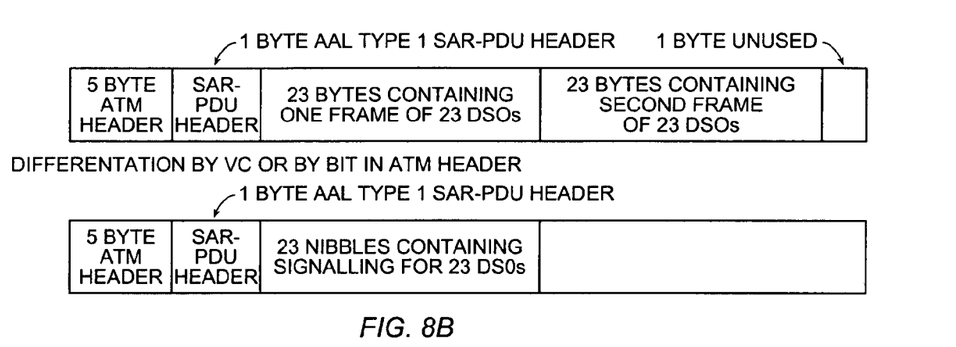
Figure 8C:
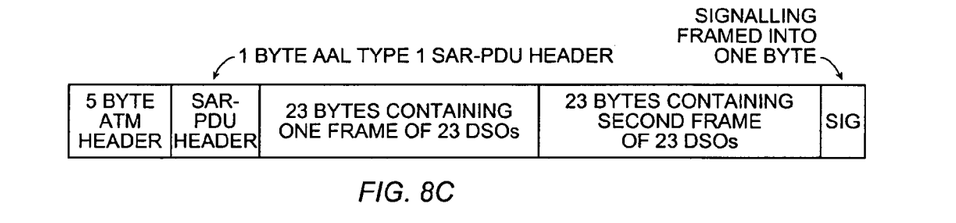

Referring to FIGS. 8a-8c, a third embodiment of a cell structure is illustrated. In the third embodiment, extra resiliency to lost cells, mis-inserted cells and high levels of jitter, may be desired when greater than one frame time of ATM cell transit delay and/or jitter exists. The extra resiliency is provided by adding the use of standard AAL type 1 segmentation and reassembly protocol data unit (SAR-PDU) header processing. Standards based header processing and buffer alignment implementations maintain bit count integrity during lost cell, mis-inserted cell and other error conditions. FIG. 8a shows a lowest delay implementation can be added by using a custom format that transfers 47 DS0s once per frame and includes the AAL type 1 SAR-PDU header byte as the $48^{th}$ ATM cell byte. As in the above embodiments, a separate signalling cell, differentiated by using a bit within the ATM header is occasionally transferred. Note that this method does not require the standard AAL type 1 CES multi-frame pointer byte, which occasionally uses an extra ATM cell payload byte, since it is known that each cell always transmits a full frame for 47 DS0s and the location of the signalling nibbles is fixed.

Similarly, 23 DS0s could be transferred with two frames per cell, yielding 46 bytes/cell, as well as the AAL type 1 SAR-PDU header byte and an unused byte, as illustrated in FIG. 8b. Note that inserting a signalling framing structure within the unused byte could eliminate the extra signalling cell, as illustrated in FIG. 8c.

Figure 9:
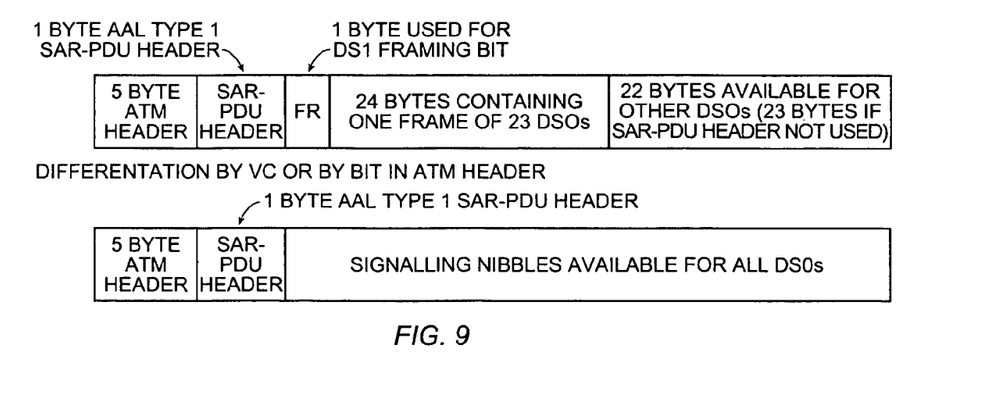
FIG. 9 is a block diagram of a cell structure in accordance with yet an alternate embodiment of the invention.

Referring to FIG. 9, a fourth embodiment of a cell structure is illustrated. In the fourth embodiment, a full DS1 (24 DS0s, plus a DS1 framing bit) is transferred every frame. This is equivalent to an AAL type 1 CES unstructured DS1 service. The DS1 framing bit occupies a $25^{th}$ byte within the ATM cell. Other DS0s can be cross-connected into the bytes not used by the 25 bytes used for the DS1 service. Note that using a bit within the ATM header cell could save the $25^{th}$ byte for transporting another DS0. This service can be used with or without the AAL type 1 SAR-PDU header byte. Other TDM streams, such as E1, can be transported in a similar manner.

Although the above description refers to the transportation of both signalling and data, in some applications, it is not required to transport signalling. Any of the data plus signalling transport mechanisms discussed herein can be implemented without the signalling nibbles and/or cells being transported.

Although the invention has been described with specific reference to ATM, it can also be applied to information transfer methods other than ATM, such as Ethernet, IP and variations thereof such as IP over ATM, and future implementations such as the Pseudo Wire Emulation Edge to Edge (PWE3) currently being developed by a charter organization, as will be appreciated by a person skilled in the art. Yet further, although the invention has been described with reference to certain specific embodiments, such as clock speeds, memory size and the like, various modifications thereof will be apparent to those skilled in the art without departing from the spirit and scope of the invention as outlined in the claims appended hereto.

The embodiments of the invention in which an exclusive property or privilege is claimed are defined as follows:

1. A DS0 time switch for cross connecting predefined input and output DS0 pairs for creating a data path in a communication network, said time switch comprising:
   (a) an input buffer for receiving input cells;
   (b) a reassembly state machine for retrieving first information from said input cells in accordance with cross-connect control requirements;
   (c) a frame buffer for storing said first information retrieved by said reassembly state machine in one or more first selected bins of a plurality of bins in accordance with at one or more first associated input DS0s; and
   (d) a segmentation state machine for retrieving second information from one or more second selected bins of said plurality of bins in said frame buffer in accordance with one or more second associated output DS0s and using said second information for assembling an output cell and transmitting said one or more second associated output DS0s via said output cell.

2. A time switch as defined in claim 1, wherein said first information includes data.

3. A time switch as defined in claim 2, wherein said first information further includes signalling.

4. A time switch as defined in claim 1 further including a segmentation timer for synchronizing the transmission of said output cell after assembly.

5. A time switch as defined in claim 1, wherein said input buffer receives data from a remote terminal and said output cell is transmitted to a host terminal.

6. A time switch as defined in claim 1, wherein said input buffer receives data from a host terminal and said output cell is transmitted to a remote terminal.

7. A time switch as defined in claim 1 instantiated within a line interface card on a remote terminal.

8. A time switch as defined in claim 1 instantiated within an Asynchronous Transfer Mode (ATM) switch on a remote terminal.

9. A time switch as defined in claim 1 instantiated within a Time Division Multiplexed (TDM) card on a remote terminal.

10. A time switch as defined in claim 1 instantiated within a server card on a remote terminal.

11. A time switch as defined in claim 1 instantiated within an Asynchronous Transfer Mode (ATM) switch on a host terminal.

12. A time switch as defined in claim 1 instantiated within a Time Division Multiplexed (TDM) card on a host terminal.

13. A time switch as defined in claim 1 instantiated within a server card on a host terminal.

14. A time switch as defined in claim 1, wherein said input cell is an ATM cell in a first format and said output cell is an ATM cell in a second format.

15. A time switch as defined in claim 14, wherein first format is the same as said second format.

16. A time switch as defined in claim 14, wherein said first and second formats are selected from the group including TDM interfaces, custom formatted AAL type 0, AAL type 1, AAL type 2 AAL type 5, IP, and Ethernet.

17. A time switch as defined in claim 14, wherein a format is used for transferring cells between a TDM interface and said time switch such that data is transmitted as soon as it is available, thereby reducing time delay of said data.

18. A time switch as defined in claim 17, wherein said format comprises a 24-DS0 frame and associated signalling.

19. A time switch as defined in claim 18, wherein each cell comprises two frames of data and a cell is transmitted after every two frames.

20. A time switch as defined in claim 19, wherein said signalling is transported in a cell with a same virtual circuit (VC) as said data, but is differentiated by a bit in a header of said cell.

21. A time switch as defined in claim 19, further including a pair of virtual circuits (VCs), wherein one of said VCs is used for delivering data and the other of said VCs is used for delivering signalling.

22. A time switch as defined in claim 18, wherein each cell comprises a single frame of data and a cell is transmitted after every frame.

23. A time switch as defined in claim 22, wherein said signalling is included in unused bytes of said cell.

24. A time switch as defined in claim 17, wherein said format comprises a 48-DS0 frame and associated signalling and each cell including a single frame of data is transmitted after every frame.

25. A time switch as defined in claim 24, wherein said signalling is transported in a cell with a same virtual circuit (VC) as said data, but is differentiated by a bit in a header of said cell.

26. A time switch as defined in claim 24, further including a pair of virtual circuits (VCs), wherein one of said VCs is used for delivering data and the other of said VCs is used for delivering signalling.

27. A time switch as defined in claim 17, wherein said format comprises a DS0 frame and associated signalling and a payload of each cell includes at least one frame and an AAL type 1 SAR-PDU header byte.

28. A time switch as defined in claim 17, wherein said format comprises a full DS1 and associated framing bit per frame, plus extra DS0s to fill the ATM cell.

29. A time switch as defined in claim 28, wherein said framing bit is transported in a payload of said cell.

30. A time switch as defined in claim 28, wherein said framing bit is transported in a header of said cell.

31. A time switch as defined in claim 1, wherein said time switch enables use of a common backplane for transport of a plurality of different data formats.

32. A time switch as defined in claim 1, further comprising TDM interfaces for cross connecting both TDM and ATM data.

33. A networked system comprising a host terminal and a remote terminal including a time switch as defined in claim 1 for providing DS0 cross-connect capability with packet-based transport of DS0s among a plurality of interconnected TDM interfaces and common cross-connect devices.

34. A standalone system comprising a time switch as defined in claim 1 for providing DS0 cross-connect capability with packet-based transport of DS0s among a plurality of interconnected TDM interfaces and common cross-connect devices.

* * * * *